Patented Mar. 2, 1937

2,072,253

UNITED STATES PATENT OFFICE 2,072,253

TREATMENT OF TEXTILE MATERIALS MADE OF OR CONTAINING CELLULOSE ESTERS

George Holland Ellis and Alexander James Wesson, Spondon, near Derby, England, assignors to Celanese Corporation of America, a corporation of Delaware No Drawing. Application May 19, 1933, Serial No. 671,826. In Great Britain June 4, 1932

12 Claims. (Cl. 8—20)

This invention relates to the treatment of materials consisting of or containing cellulose acetate or other esters of cellulose, and is more particularly concerned with improving the resistance of such materials to hot ironing or like operations.

It is well known that textile materials containing cellulose acetate frequently suffer from the disadvantage that they are easily damaged by ironing at too high a temperature. In the case of cellulosic materials the temperature at which the materials may be safely ironed is limited only by the temperature at which the particular material in question is scorched. In the case of cellulose acetate materials, however, fusion may occur at temperatures much below the scorching temperature, and the material irretrievably damaged.

In U. S. Patent No. 1,963,121 issued June 19, 1934, is described the subjection of cellulose ester materials first to partial or superficial saponification and then to a weighting treatment, or vice versa. By this treatment a very considerable improvement in the safe ironing temperature of the material may be attained and materials may be produced which, as regards resistance to hot ironing, fulfil practically all commercial requirements. The weighting of cellulose ester materials is not however as inexpensive an operation as could be desired, and, moreover, as the operation generally necessitates the swelling of the material, it is one which requires a very considerable degree of skill and care in its performance.

We have now found that the safe ironing point of cellulose acetate or other cellulose ester materials may be raised in a particularly easy and economical manner by first subjecting the materials to superficial saponification and thereafter incorporating compounds which do not melt below the desired safe ironing temperature, preferably inorganic compounds, in the surface layer of cellulose so produced on the material. In this manner products may be obtained in which the filaments comprise a central core of the cellulose ester surrounded by a layer consisting substantially of cellulose impregnated with an inorganic or other compound which only melts, if at all, at high temperatures. They exhibit great resistance to hot ironing. For example by surface saponifying a cellulose acetate fabric and incorporating in the saponified material a mixture of sodium fluoride and borax, a material may be produced which may be safely ironed at temperatures up to 300° C. as compared with a safe ironing temperature of about 225-230° C. for the untreated cellulose acetate material.

The incorporation of the inorganic or other substances in the saponified portion of the partially saponified material may readily be effected with the aid of simple aqueous solutions of the desired substance, where the latter is sufficiently soluble. The requisite quantity of the substance, dissolved in no more water than can be retained by the material, is applied to the latter, e. g. by padding, spraying or the like. The material is then dried. In cases where the desired substance to be incorporated is insoluble or difficultly soluble it may likewise be incorporated by the use of simple aqueous solutions of reagents, the latter being selected so as to yield the desired substance by interaction on the material. Simple aqueous reagents are well absorbed by the saponified portion of the material. The incorporation of the substance thus does not necessitate the employment of swelling agents which, as explained above, are in general necessary when weighting cellulose ester materials, and in consequence the new process is both economical and free from manipulative difficulties.

Superficial saponification of the cellulose ester material may be effected in any convenient manner and either by bath treatments, or by padding or otherwise mechanically impregnating the material with the requisite proportion of saponifying agent and thereafter causing the latter to exert its effect. For example, in the case of a bath treatment the material may be treated in a 60:1 bath containing about 0.5 gram per litre of soap and sufficient caustic soda to effect the desired degree of saponification. In order to ensure level saponification the alkali may if desired be added in stages as the saponification proceeds, care being taken that the alkali concentration does not exceed about 1 gram per litre at any time during the process. Again, the alkali may be applied by padding or printing in the form of an aqueous solution thickened with gum arabic or other suitable thickening agent. Thus, very satisfactory results may be secured by padding the material with a gum arabic solution containing 50-100 grams per litre of caustic soda, the padding machine being adjusted so as to leave in the materials about 75-100 per cent. of their weight of the alkaline solution. For further details of methods of effecting a surface saponification of cellulose ester materials, reference may be made to prior U. S. Patents Nos. 1,897,691, 1,884,620, 1,884,621, 1,884,622 and 1,884,623, No. 1,920,188 issued Aug. 1, 1933 and British Patents Nos. 351,417 and 309,377.

The degree of saponification utilized may be varied according to the results desired. In general, highly satisfactory results may be secured as regards the resistance to ironing ultimately attained, if the saponification is conducted so that the material loses about 4 per cent. or more of its weight. As regards the elevation of the ironing point secured, however, it is in general unnecessary to carry out the saponification to the extent of a loss in weight greater than about 7 or 8 per cent. Very satisfactory results indeed may be secured with saponification to the extent of a loss in weight of 5 to 6 per cent.

The compounds, preferably inorganic, incorporated in the cellulose layer may be of widely varying character, for example they may be borates, phosphates, sulphates or fluorides or other halides. The compounds employed should only melt, if at all, at temperatures above, and preferably well above, the temperature at which a cellulose material may be safely ironed without material scorching, e. g. temperatures above 300° C. Particularly good results may be secured by the use of water-soluble salts, both as regards the elevation of the ironing point attained and the ease of incorporation of the salt in the material. Mixtures of two or more compounds may be used if desired. Thus, alkali metal salts of the foregoing type may be employed and, as indicated previously, particularly valuable results may be obtained by the use of sodium fluoride or borax and in particular by the use of a mixture of the two. The material saponified to a loss in weight of about 5.5% may for instance be padded with an aqueous solution containing per litre about 45 grams of sodium fluoride and 20 grams of borax.

Amongst other compounds which may be employed mention may be made of magnesium sulphate or chloride, potassium sulphate, potash alum, potassium magnesium chloride, sodium sulphate, and sodium silicofluoride. The compounds may if desired be such as have a fireproofing character or be used in admixture with such compounds, for example halides, borates or phosphates of ammonia or other volatile bases or mixtures of such compunds.

In the case of lining fabrics and other materials commonly required to resist hot ironing, but not called upon to resist washing or like aqueous treatments, the solubility of the compounds in water is not a matter of importance or any substantial disadvantage in practice.

If desired, however, insoluble compounds or mixtures of compounds may be incorporated in the material. Such compounds may be for instance the insoluble salts of aluminium, magnesium, calcium, barium, strontium, tin or other metals with boric, phosphoric, sulphuric, oxalic or other acids. Such compounds may in some cases be applied directly to the materials in the form of colloidal solutions or dispersions. Thus silica or alumina may be applied in the form of colloidal aqueous solutions, being fixed in the material by a simple drying operation. Most conveniently, however, insoluble compounds are incorporated by treating the partially saponified materials in succession with reagents adapted to react to form the desired insoluble compound. Thus, for example, magnesium or zinc ammonium phosphate may be incorporated by impregnating the material with a soluble magnesium or zinc salt and thereafter subjecting it to the action of a sodium phosphate solution containing ammonia.

Again tin compounds may be incorporated by first padding with stannic chloride and then fixing with sodium phosphate. Where tin or like weighting metal compounds are employed, however, care should be taken to avoid any substantial swelling of the cellulose ester portion of the material during the treatment, as otherwise the cellulose ester core may be weighted and not the saponified layer alone, as is to be preferred. Reagents may for instance be applied in the presence of substances which repress swelling. Thus tin or other weighting metal salts may be applied in the presence of alkali metal salts or other substantially neutral salts yielding anions of the same kind. For example stannic chloride may be applied in the presence of a substantial proportion of sodium chloride.

The proportion of inorganic or other compound applied may vary within wide limits. Preferably it should be as high as possible consistent with the maintenance of such other properties, for example in respect of handle, as may be desired. It has been found that generally speaking good results are obtained by incorporating sufficient substance to make good the loss in weight due to saponification.

The incorporation of the substance in the material is, in the case of a soluble substance, necessarily effected after all aqueous treatments which may be necessary in the production of the finished fabric. Thus the borax and sodium fluoride treatment referred to above is preferably carried out after the dyeing and any softening or like treatment which may be necessary. If desired, however, the application of the inorganic substance may be combined with the final aqueous treatment, for example a treatment with sulphonated oil or the like, such as is commonly applied to fabrics in order to impart the desired handle.

In addition to cellulose acetate materials the new process may be applied to any materials consisting of or containing cellulose esters liable to fusion or other damage under the influence of hot ironing or like treatments. As examples of such esters mention may be made of cellulose formate, propionate and butyrate, and also mixed esters, for example cellulose nitroacetate or acetate-butyrate. The materials may consist wholly of the cellulose ester, or in part of a cellulose ester and in part of other materials, for example natural cellulosic or animal fibres, or artificial fibres of the regenerated cellulose kind. The invention is applicable not only to textile materials but also to other materials, for example foils, films, ribbons and the like containing cellulose esters.

The invention is illustrated but not limited by the following examples:—

*Example 1*

A woven fabric of cellulose acetate, preferably scoured, is mechanically impregnated in a continuous manner (for example, by means of a three bowl mangle) in a cold aqueous solution of 85 grams per litre sodium carbonate. The pressure of the bowls is adjusted so that the fabric takes up 78% of its own weight of the liquor. The fabric is now steamed for 20 minutes in a continuous steamer such as is used in the textile printing industry and then washed. The loss in weight of the dry goods should now be around 6%. After dyeing, if desired, the fabric is dried, and in a similar machine to that above mentioned is again subjected to an open width mechanical impregnation, this time with a solution containing per litre 45 grams sodium fluoride and 20 grams borax. A small proportion of a wetting-out agent which resists the salts, for example a sulphonated higher fatty alcohol, may advantageously be added.

Following this impregnation the fabric is dried directly and finished as desired.

*Example 2*

A fabric of cellulose acetate yarns is impregnated in a continuous fashion, for example in a pad mangle with engraved pad rollers (or in a printing machine employing pad rollers), with a solution containing 80 grams per litre caustic soda, thickened if desired with maize starch, gum arabic or other suitable substance. The fabric is then dried and steamed in a continuous ager for about 10 minutes and then washed. If the weight of liquor or paste taken up has been about 78% of the weight of goods the loss in weight at this stage should be about 6%.

The goods treated as above are now mechanically impregnated on a padding mangle with a 20% solution of calcium chloride and rolled up for 3 hours after which they are mechanically impregnated with a 25% solution of disodium hydrogen phosphate. After further rolling up to allow the chemical reaction to proceed, the goods are washed off and finished as desired.

*Example 3*

A cellulose acetate fabric partially saponified according to Example 1 or 2, is impregnated with a 10% solution of barium thiocyanate and afterwards with a 10% solution of sodium sulphate at 40° C. for the deposition of barium sulphate, instead of the calcium phosphate of the second example.

*Example 4*

A fabric partially saponified according to Example 1 or 2 is mechanically impregnated with a solution containing 150 grams per litre of stannic chloride and 80 grams per litre common salt, rolled up, and again directly treated for 15 minutes at 40° C. in a solution containing 80 grams per litre disodium hydrogen phosphate.

Cellulose acetate fabrics processed in accordance with the foregoing examples may be safely ironed at much higher temperatures than is possible in the case of the materials not so processed.

What we claim and desire to secure by Letters Patent is:—

1. Process for increasing the resistance to heat of materials containing cellulose esters, which comprises subjecting the cellulose ester to surface saponification and incorporating, in the saponified surface layer under such conditions that swelling of the cellulose ester part of the material is avoided, a substance which is solid at the highest temperature at which cellulose may be ironed without substantial scorching.

2. Process for increasing the resistance to heat of materials containing cellulose esters, which comprises subjecting the cellulose ester to surface saponification and incorporating, in the saponified surface layer under such conditions that swelling of the cellulose ester part of the material is avoided, a substance which is solid at 300° C., said substance being substantially confined to the saponified surface layer.

3. Process for increasing the resistance to heat of materials containing cellulose acetate, which comprises subjecting the cellulose acetate to surface saponification and incorporating, in the saponified surface layer under such conditions that swelling of the cellulose acetate part of the material is avoided, a substance which is solid at 300° C., said substance being substantially confined to the saponified surface layer.

4. Process for increasing the resistance to heat of materials containing cellulose acetate, which comprises subjecting the cellulose acetate to surface saponification so as to bring about a loss of substantially 4-8% in the weight of the cellulose acetate and incorporating, in the saponified surface layer under such conditions that swelling of the cellulose acetate part of the material is avoided, a substance which is solid at 300° C., said substance being substantially confined to the saponified surface layer.

5. Process for increasing the resistance to heat of materials containing cellulose acetate, which comprises subjecting the cellulose acetate to surface saponification and incorporating, in the saponified surface layer under such conditions that swelling of the cellulose acetate part of the material is avoided, a substance selected from the group of alkali fluorides and borates.

6. Process for increasing the resistance to heat of materials containing cellulose acetate, which comprises subjecting the cellulose acetate to surface saponification and incorporating sodium fluoride and borax in the saponified surface layer under such conditions that swelling of the cellulose acetate part of the material is avoided.

7. Materials containing a cellulose ester, said cellulose ester having a saponified surface layer impregnated with a substance which is solid at the highest temperature at which cellulose may be ironed without substantial scorching, said substance being substantially confined to the saponified surface layer.

8. Materials containing a cellulose ester, said cellulose ester having a saponified surface layer impregnated with a substance which is solid at 300° C., said substance being substantially confined to the saponified surface layer.

9. Materials containing cellulose acetate, said cellulose acetate having a saponified surface layer impregnated with a substance which is solid at 300° C., said substance being substantilly confined to the saponified surface layer.

10. Materials containing cellulose acetate, said cellulose acetate having a saponified surface layer corresponding to a loss in weight of substantially 4-8% of the cellulose acetate and impregnated with a substance which is solid at 300° C., said substance being substantially confined to the saponified surface layer.

11. Materials containing cellulose acetate, said cellulose acetate having a saponified surface layer impregnated with a substance selected from the group of alkali fluorides and borates, said substance being substantially confined to the saponified surface layer.

12. Materials containing cellulose acetate, said cellulose acetate having a saponified surface layer impregnated with sodium fluoride and borax which is substantially confined to the saponified layer.

GEORGE HOLLAND ELLIS.
ALEXANDER JAMES WESSON.